United States Patent [19]
Weber

[11] Patent Number: 5,422,756
[45] Date of Patent: Jun. 6, 1995

[54] BACKLIGHTING SYSTEM USING A RETROREFLECTING POLARIZER

[75] Inventor: Michael F. Weber, Shoreview, Minn.

[73] Assignee: Minnesota Mining and Manufacturing Company, St. Paul, Minn.

[21] Appl. No.: 885,281

[22] Filed: May 18, 1992

[51] Int. Cl.$^6$ ............................................. G02B 5/30
[52] U.S. Cl. ........................ 359/487; 359/490; 359/494; 359/529; 359/589; 362/19
[58] Field of Search .............. 359/352, 487, 488, 490, 359/493, 494, 495, 497, 501, 527, 528, 529, 530, 546, 589; 362/19, 31; 357/831, 834

[56] References Cited

U.S. PATENT DOCUMENTS

| | | | |
|---|---|---|---|
| 2,403,731 | 7/1946 | MacNeille | 88/65 |
| 2,748,659 | 6/1956 | Geffcken et al. | 359/487 |
| 4,791,540 | 12/1988 | Dreyer, Jr. et al. | 362/331 |
| 4,805,984 | 2/1989 | Cobb, Jr. | 350/96.28 |
| 4,841,908 | 6/1989 | Jacobson et al. | 118/718 |
| 4,874,631 | 10/1989 | Jacobson et al. | 427/39 |
| 4,906,070 | 3/1990 | Cobb, Jr. | 350/286 |
| 4,913,529 | 4/1990 | Goldenberg et al. | 350/337 |
| 4,917,465 | 4/1990 | Conner et al. | 350/335 |
| 4,966,438 | 10/1990 | Mouchart et al. | 350/173 |
| 4,966,441 | 10/1990 | Conner | 350/335 |
| 4,974,219 | 11/1990 | Korth | 369/13 |
| 5,013,107 | 5/1991 | Biles | 350/3.7 |
| 5,061,050 | 10/1991 | Ogura | 359/490 |
| 5,124,841 | 6/1992 | Oishi | 359/487 |

FOREIGN PATENT DOCUMENTS

| | | | |
|---|---|---|---|
| 0578035 | 6/1959 | Canada | 359/487 |
| 0422661A2 | 4/1991 | European Pat. Off. | G02B 27/28 |
| 2343771 | 3/1974 | Germany | 359/487 |
| 61-17103 | 1/1986 | Japan | G02B 5/30 |
| 61-262705 | 11/1986 | Japan | 359/487 |

OTHER PUBLICATIONS

"Headlights for Motor-Vehicles with Polarized Light", Dr. E. Zehender, *Lichttechnik*, Reprint of 25 (#3), 100–103 (1973), HELIOS-Publ. Ltd.

"Novel Polarized Liquid-Crystal Color Projection and New TN-LCD Operating Modes", Martin Schadt, Jurg Funfschilling, *SID 90 DIGEST*, pp. 324–326.

*Primary Examiner*—Ricky D. Shafer
*Attorney, Agent, or Firm*—Gary L. Griswold; Walter N. Kirn; Eric D. Levinson

[57] ABSTRACT

A backlighting system employs a retroreflecting polarizer, comprising optical thin films coated on a structured material, to divide an incident beam of light into polarized components. One component is transmitted through the polarizer and the other is rejected. Optionally, a reflector (for example, a diffuser with a reflective layer) may be used; or, an absorbing polarizer may be added; or, a birefringent material may be included in the system.

7 Claims, 4 Drawing Sheets

BACKLIGHTING SYSTEM USING A RETROREFLECTING POLARIZER

TECHNICAL FIELD

This invention relates to optical systems for backlighting applications that employ polarizing thin film stacks coated onto substrates having structured surfaces.

BACKGROUND

A MacNeille polarizer comprises alternating repeating layers of a pair of thin film materials deposited on a bulk substrate material. The pair of thin film materials comprises one low refractive index material and one high refractive index material. The indices, called a MacNeille pair, are chosen such that, for a given angle of incidence of a light beam, the reflection coefficient for p-polarized light ($r_p$) is essentially zero at each thin film interface. The angle at which $r_p$ is zero is called the Brewster angle, and the formula relating the Brewster angle to the numerical values of the indices is called the MacNeille condition. The reflection coefficient for s-polarized light ($r_s$) is non-zero at each thin film interface. Therefore, as more thin film layers are added, the total reflectivity for s-polarized light increases while the reflectivity for p-polarized light remains essentially zero. Thus, an unpolarized beam of light, incident upon the thin film stack, has some or all of the s-polarized component reflected while essentially all of the p-polarized component is transmitted.

Such a thin film stack is deposited on two general types of substrates, which then classifies the type of polarizer produced as either immersed or non-immersed. For example, if the thin films are deposited on a flat face which forms the hypotenuse side of a right angle (Porro) prism, and bonded to the similar side of an identical prism, the polarizer is an immersed polarizer. If the thin films are bonded between two planar slabs of transparent media, the polarizer is a non-immersed polarizer. In general, a polarizer is non-immersed if the geometry of the bulk encapsulant does not affect the immersion constant $n_i*\sin(\theta_i)$ of the light beam in a thin film material $m_i$.

For either immersed or non-immersed polarizers, the p-polarization component of an incident light beam is transmitted, while the s-polarization component is reflected from the thin film stack at an angle equal to the angle of incidence. The total change in direction of the s-polarization component from the incident direction is 90° for cube polarizers and usually about 60° for slab polarizers. Thus, the s-polarization component is typically unavailable for further use, leading to a decrease in overall intensity of light available, unless additional optics are employed to redirect the s-polarization component. For example, U.S. Pat. No. 4,913,529 (Goldenberg et al.) discloses a liquid crystal display (LCD) television projection system using two reflectors, a polarization rotator and a prism to recombine both components.

Such systems are undesirably large for use in many common visual display systems, such as overhead projectors, and especially in portable or laptop computer displays where a thin profile is desired. However, in some applications the need for a thin profile, or the need to prevent heat buildup, justifies use of only the p-polarization component.

DISCLOSURE OF INVENTION

The invention is a backlighting system employing a source of incident light of mixed polarization, a retroreflective polarizer, a diffuser, and a display device employing polarized light. The retroreflective polarizer divides the incident light into s-polarized and p-polarized components, transmits the p-polarized component to the display device, and reflects the s-polarized component back to the diffuser, along with portions of the p-polarized component lying outside a certain cone angle.

If the diffuser is partially transparent, the backlighting system may further comprise a reflector arranged so that the s-polarized component is incident upon the diffuser, which scatters a portion of the s-polarized light. A remainder portion of the s-polarized light incident upon the diffuser passes through the partially transparent diffuser, is incident upon the reflector, and is reflected back to the partially transparent diffuser. One suitable reflector comprises a reflective layer deposited on the side of the diffuser opposite from the side upon which the s-polarized light is incident. The diffuser/reflector depolarizes the light and returns it to the retroreflecting polarizer, which again transmits the desired component.

In another embodiment, an absorbing polarizer may be added to the backlighting system to tailor the performance of the system, either through absorption at specific wavelengths, or broadly across the spectrum. Also, the backlighting system may further comprise a birefringent material (to depolarize the light reflected from the polarizer).

The retroreflecting polarizer used in the invention comprises:
(a) a first material having a structured surface consisting of a linear array of substantially right angled isosceles prisms arranged side by side and having perpendicular sides which make an angle of approximately 45° with respect to the Tangent to a smooth surface opposite the structured surface,
(b) a second material essentially like the first material,
(c) on the structured surface of at least one material, at least one optical stack of alternating layers of high and low refractive index materials of selected optical thicknesses; the first and second materials all optically cemented to form a single unit in which the refractive index of the first and second materials, and the refractive indices and optical thicknesses of the layers of the optical stack, are all chosen to produce selective reflection of polarized light, such that:
(d) within one portion of the optical stack, an incident light beam of mixed polarization is separated into an s-polarized component and a p-polarized component,
(e) the s-polarized component is reflected onto another portion of the optical stack and there reflected parallel to the incident beam but proceeding in an opposite direction, and
(f) the p-polarized component is transmitted parallel to the incident beam.

DETAILED DESCRIPTION OF THE INVENTION

Figure 1:
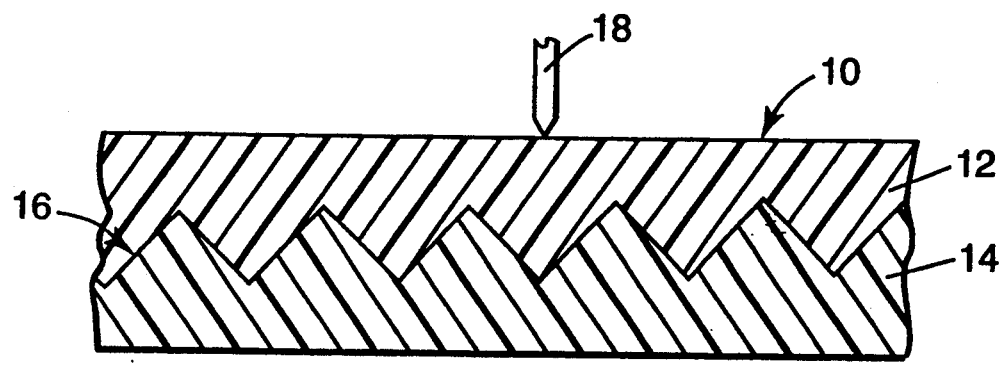
FIG. 1 is a cross sectional view of a portion of one preferred embodiment of the retroreflective polarizer component of the invention.
Figure 2:
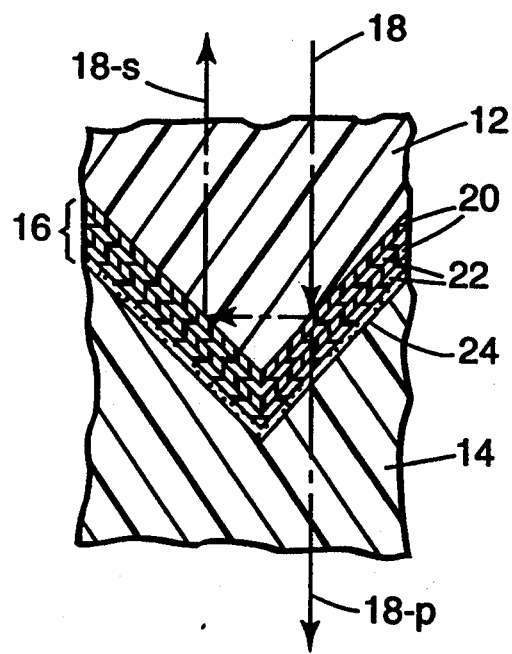
FIG. 2 is an enlarged sectional view of a portion of the embodiment of FIG. 1.

FIGS. 1 and 2 show the retroreflecting polarizer 10, which is a component of the backlighting system of the invention. Retroreflective polarizer 10 comprises two pieces of transparent substrate material 12 and 14, between which is a composite optical stack 16.

The pieces 12,14 each have structured surfaces (which face each other), and non-structured surfaces. As shown, piece 12 is a top layer and piece 14 is a substrate, but the entire assembly may be inverted with no loss of functionality, essentially interchanging the roles of the two pieces.

In the embodiment shown, the composite optical stack 16 is deposited upon the structured surface of the upper piece 12, and the structured surface of the lower piece 14 is optically cemented (i.e., adhered by a very thin layer of transparent adhesive) to the composite optical stack 16 by an adhesive 24 to form a single unit. However, the composite optical stack could comprise two sub-stacks, one sub-stack deposited on the top layer and the other deposited on the substrate, with adhesive 24 between the two sub-stacks.

The composite optical stack comprises at least one set of pairs of alternating layers of materials having low and high indices of refraction compared to each other. The thicknesses of the layers are chosen such that the quarterwave criterion is met for the wavelength of the incident collimated light beam 18 by each of layers 20 and 22. The shape of the structured surfaces, the optical properties of the substrate material, and the properties of the composite optical stack, all combine to divide the incident light beam into two polarization components. One component, 18-s, is reflected twice in such a manner as to be retroreflected, i.e., directed back toward the source of light beam 18. The other component, 18-p, is transmitted parallel to incident beam 18. The terms s-polarization and p-polarization are defined with respect to the prism faces, not the outside surfaces of the polarizer.

In FIG. 2, the division of incident light 18 into components 18-s and 18-p is shown as occurring at the first interface between the substrate and the composite optical stack, but this is illustrative only. Actually, some division occurs at each interface between thin films, with the net result being as shown.

In the embodiment shown, the composite optical stack comprises a repeating stack of a pair of materials. One of the materials is a relatively low refractive index ($n_L$) material 20, and the other is a relatively high index ($n_H$) material 22. The construction of such a stack 16 is abbreviated $(HL)^2$. In general, more layers are used, such as a $(HL)^5$ stack, and generally the average optical thickness of each material is a quarterwave thick, with reference to a chosen wavelength of interest (typically but not necessarily in the visible spectrum). However, to optimize performance, the individual thicknesses of all thin film layers are varied slightly from the average thickness, in accordance with known principles, using commercially available software to calculate the desired values.

Also, more than two pairs of materials or average thicknesses may be used, such as a $(H_1L_1)^5+(H_2L_2)^5$. This would be done to extend the useful optical bandwidth of the retroreflective polarizer or the range of angles over which it reflects essentially all s-polarized light.

Each of substrate pieces 12 and 14 comprises a transparent, preferably integral (i.e., a single continuous piece as opposed to an assembly or a laminate) material having a structured surface which consists of a linear array of substantially right angled isosceles prisms arranged side by side. The perpendicular sides of each prism make an angle of approximately 45° with respect to the smooth surface opposite the structured surface (or, in the most general case of a flexible substrate, with respect to the tangent to the structured surface). Angles other than 45° are useful for other applications, but angles near 45° (e.g., 40° to 50°) are preferred. This places a constraint on the design of the optical stack: only two of the three indices of refraction ($n_L$ and $n_H$ for the optical stack, $n_O$ for the substrate pieces) can be chosen independently. (An additional implication is that $n_L$ must always be less than $n_O$ if high transmission of p-polarized light is desired at all wavelengths.) These values are determined by the MacNeille condition relating the Brewster angles of each material interface to the numerical values of the indices of the materials forming the interface:

$$\tan(\theta_L) = (n_H/n_L)$$

or, $$\tan(\theta_L) = (n_L/n_H)$$

along with Snell's law relating $\theta_O$ to $\theta_L$ and $\theta_H$.

In theory, an infinite set of values of $n_H$ and $n_L$ exist for a given $n_O$, but in practice, the available choices of materials for the substrate pieces and thin films are limited, and design of the retroreflective polarizer reduces to choosing which of the limited set of values of $n_H$ and $n_L$ around that value of $n_O$ will produce the desired results. The greater the difference between $n_L$ and $n_H$, the wider the optical bandwidth over which the retroreflective polarizer will divide incident light into separate polarizations.

A suitable thickness of the substrate is 0.36 millimeters, measured from the smooth surface to the highest point of the grooves. Suitable groove heights (measured perpendicularly) are 0.18 mm. For such a film, about 28 peaks per centimeter is preferred, but there is wide latitude in the dimensions.

Preferred substrate materials are flexible, homogeneous, and isotropic. Suitable materials include commercially available acrylics and polycarbonates having nominal indices of refraction of 1.49 and 1.59, respectively. Other possible materials, selected to provide the required functionality, include polypropylenes, polyurethanes, polystyrenes, and polyvinylchlorides. Generally, polycarbonates are preferred for their relatively high indices of refraction, clarity, and physical properties.

Higher index materials include polysulphone (and variations such as polyethersulphone and polyarylsulphone), polyethylene teraphthalate (PET), and polyethylene napthalate (PEN). The sulphones require high processing temperatures, but in turn can withstand higher ambient temperatures in use. PET and PEN may crystallize or exhibit birefringence depending on the process parameters. All these materials have indices in the range of 1.63 to 1.65, and as such, allow the use of the film pair $SiO_2/TiO_2$ while retaining high transmission of p-polarized light.

A suitable material is taught in U.S. Pat. No. 4,805,984 (Cobb, Jr.), but in this application the total internal reflection property of that material is not relevant, because the optical properties of the material are significantly changed when it is employed in this application.

Suitable materials for the thin films 20 and 22 include any materials which are transparent (exhibit low absorption) in the spectrum of interest. For broadband visible light, suitable thin film materials are silicon dioxide ($SiO_2$) (n=1.45); amorphous hydrogenated silicon nitride (a-SiN:H) (n=1.68-2.0); titanium dioxide ($TiO_2$) (n=2.2-2.5); magnesium fluoride ($MgF_2$) (n=1.38); cryolite ($Na_3AlF_6$) (n=1.35); zinc sulphide (ZnS) (n=2.1-2.4); zirconium oxide ($ZrO_2$) (n=2.05); hafnium oxide (n=2.0); and aluminum nitride (n=2.2).

Several thin film deposition techniques can be used to deposit the composite optical stack on the substrate. Thermal and electron beam evaporation, and ion beam sputtering are the methods of choice for precision optical coatings, the latter method producing superior films in terms of adhesion to the substrate, hardness, and environmental stability. Magnetron sputtering is also used extensively for broadband coatings such as antireflective coatings on glass, and especially for large area applications such as architectural glass. However, on the whole, thermal and electron beam evaporation should provide good thin film qualities and sufficiently high deposition rates for acceptable manufacturing rates. More importantly, low index films such as magnesium fluoride and cryolite can be deposited by this method. Electron beam deposition is regularly used in the coatings industry for high index materials such as titanium dioxide, zirconium oxide, hafnium oxide, and aluminum nitride.

An additional consideration is to ensure the uniform coating of the prism faces, from peak to valley. Any process that includes scattering of incident atoms via gas phase collisions will invariably cause the coating to be thicker on the peaks than in the valleys. Basically, two regions of gas pressure can be used successfully. The low pressure regime used in high vacuum evaporation will provide the most uniform coating. High pressures used in PAVCD or CVD, such that the gas-atom mean-free-path is much less than the peak-to-valley distance, will also provide a relatively uniform coating. The latter method may be incapable of producing a sharp bandedge such as that required in a good color polarizer, but would be sufficient for a broadband polarizer. For the prism dimensions noted here, pressures of 1 Torr or greater would be desirable. The more nonuniform the layers are, the greater number of film layers required to product good s-polarization reflection over the entire desired bandwidth (usually 400 to 700 nm).

The process used in the reduction to practice of the retroreflective polarizer was plasma assisted chemical vapor deposition (PACVD). Using this PACVD, the following procedures and resultant products are possible.

$SiO_2$ may be deposited by reacting silane ($SiH_4$) or almost any organosilane in the PAVCD process with oxygen or nitrous oxide at between 50 and 250 milliTorr, using low power RF plasmas of about 50–100 watt/$ft^2$ of electrode area. Nitrous oxide is somewhat preferred because it generally results in less powder formations in the gas phase.

$TiO_2$ may be formed by reacting titanium tetrachloride ($TiCl_4$) with oxygen and nitrous oxide at the same power levels. By varying both the relative and absolute flow rates of the $O_2$ and $N_2O$ for a given flow of $TiCl_4$) vapor, the index of refraction of the film is easily varied, from 2.0 to 2.4. Residual chlorine in the film can result in poor adhesion to polycarbonate. An oxygen flow of several times in excess of the reactant gas is preferred.

The visibly transparent a-SiN:H material has an index of refraction which varies mainly as a function of deposition temperature, with the higher indices requiring temperatures of 250 Celsius or more. The films may be deposited from mixtures of silane, ammonia, and nitrogen. Films formed at lower temperatures from conditions suitable for high index films (i.e., silane, starved nitrogen, no ammonia) produce undesirably high absorption of blue light. It is possible to form films having indices between 1.68 and 1.8 on polycarbonate below 100 C., with low optical absorption, although the lower index films are somewhat brittle.

The PACVD process was carried out using a deposition system according to the teachings of U.S. Pat. Nos. 4,841,908 and 4,874,631 (Both Jacobson, et al.). Briefly, this multi-chamber deposition system employs a large volume vacuum chamber within which are plurality of deposition chambers for different composition layers, each chamber having separate seals to minimize back diffusion of any dopant gases from adjacent deposition chambers. A continuous roll of substrate proceeds from a supply roll through each of the deposition chambers and onto a finished take-up roll. The direction of web travel is reversed repeatedly to produce the multiple layers of repeating refractive index materials.

The index of refraction ($n_A$) of the adhesive 24 should match that of the upper and lower pieces 12 and 14 as closely as possible. When the index of the adhesive is less than that of the adjoining pieces, the non-zero thickness of the adhesive leads to some refraction of light away from the original beam direction. The refractive loss occurs near the prism peaks, and is proportional to the thickness of the adhesive, and to the index mismatch. Light entering parallel adjoining prism facets is not refracted from its original direction. However, light rays exiting a prism face near a peak can be refracted such that it enters a neighboring perpendicular facet. These rays are then refracted out of the original beam direction.

Adhesives of $n_A=1.56$ are available from the Norlund Company. Suitable adhesives are Norlund numbers 61 and 81 optical cements ($n_A=1.56$). Another ultraviolet curable resin ($n_A=1.50$) can be made from Union Carbide number ERL 4221 epoxy resin with 1% (by weight) Minnesota Mining and Manufacturing Company number 41-4201-91185 sulphonium salt initiator. The initiator is dissolved in methelene chloride which must be evaporated off before mixing with the epoxy. Other UV curable mixtures, not as preferred, may be made from urethane acrylate base resins, diacrylate diluents, and suitable photoinitiators. UV curable adhesives may cause slight absorption, mainly in the blue end of the spectrum, in the completed polarizer of about 1-2%. Any thermosetting adhesive or epoxy will work also, provided it has low optical absorption and high index.

Retroreflecting Polarizer Example

Alternating thin film layers of matched quarterwave optical thickness were coated on the structured side of a 14 mil thick polycarbonate version of the preferred substrate material described in U.S. Pat. No. 4,805,984 (Cobb, Jr.) In Example 1, coating was done by the plasma assisted chemical vapor deposition (PACVD) process described above, using a 5 inch wide and 8 inch long gas "showerhead" type electrode. To form the retroreflective polarizer, an uncoated piece of the TIR material was adhered to the optical stack with an optical adhesive.

In Example 1, the polarizer had three optical stacks, each having twelve layers, either silicon dioxide ($SiO_2$) or titanium dioxide ($TiO_2$). The unusually high number of layers was required because the PACVD technique as described above did not produce a uniform film thickness near the prism peaks as opposed to the bottoms of the grooves. The first stack had a quarterwave thickness centered at 400 nm, the next centered at 550 nm, the third centered at 700 nm. Transmissivity of the s-polarization component, $T(s)$, was at or near zero throughout nearly all the visible spectrum, while reflectivity of that component, $R(s)$, approached the 95% level typical of the most efficient common reflectors. Transmissivity of the p-polarization component, $T(p)$, was very acceptable, nearly 80% or more throughout the visible spectrum.

Figure 5:
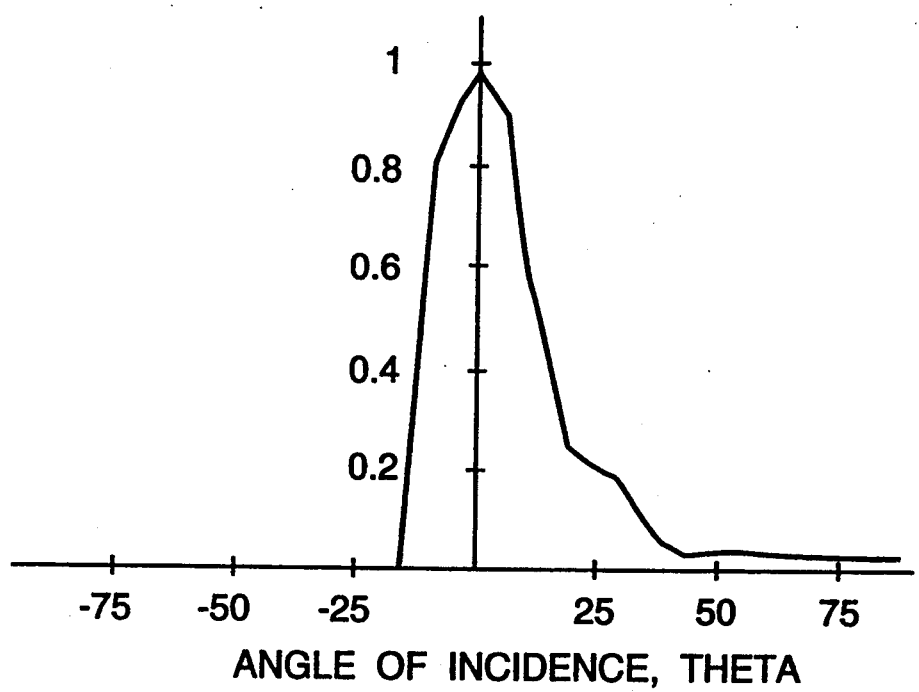
FIG. 5 is a graph of the computer calculated transmission of p-polarized light through one embodiment of the retroreflective polarizer component of the invention.

Prior to considering different configurations of the invention, it is useful to provide a few details of the angular dependence of the retroreflecting polarizer. The first feature is the angular dependence of transmission for p-polarized light, through one prism facet. The angle is measured in air from the unit vector normal to the outside surface of the retroreflecting polarizer. The computer calculated angular dependence is shown in FIG. 5, for a wavelength of 450 nm. The film stack is a combination of three stacks designed to cover the visible spectrum at all angles of incidence. The transmission spectrum vs. angle is broader at longer wavelengths ($\pm 45°$ at 650 nm). This stack comprises twenty-eight layers: an eight layer stack centered at 600 nm and 45° (immersed), along with a double stack, of ten layers each, designed for 15°, with center wavelengths of 450 and 600 nm.

The asymmetry of p-polarized transmission for positive and negative values of theta arises from the inclination of the prism facets at 45° from the substrate surface, whereas the angles in FIG. 5 are measured in air from the normal to the outside surface. Total transmission through the polarizer is the sum of two transmissions, at complimentary angles, through two opposing facets. When both terms are taken into account, the transmission curve is symmetrical. Tertiary and higher order reflections from light transmitted laterally at the second prism can be accounted for as well, but do not have a great impact on the shape of the curve.

Applications

The invention is suitable for applications where higher brightness or efficient lighting sources are demanded for backlighting displays that require polarized light for their operation. Diffuse backlighting sources presently supply unpolarized light to displays that require polarized light for their operation, such as liquid crystal devices (LCDs). At least one polarization component is absorbed by the display, which reduces the potential brightness of the display, and causes heating of the display panel. In this invention, the thin profile and light weight of the retroreflecting polarizer permit the construction of efficient backlighting systems without nominally increasing their weight or bulk. The reflecting nature of the polarizer prevents heat build-up that could adversely affect the performance of components of the system such as the liquid crystal material itself.

Figure 3:
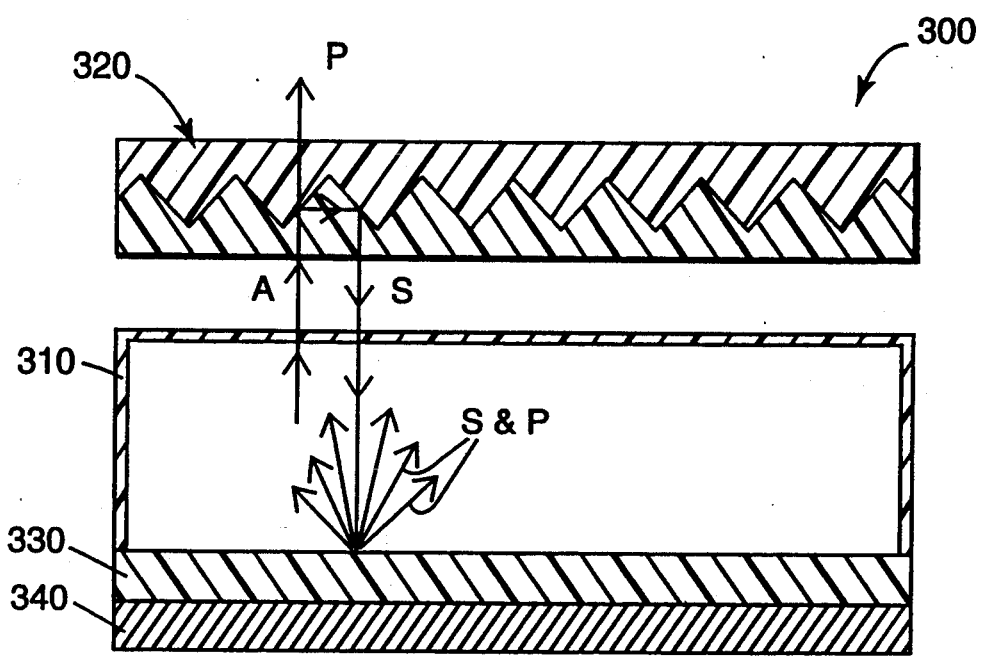
FIG. 3 is a schematic cross sectional view of an optical system according to the invention.

In basic terms, the backlighting system of the invention is shown schematically in FIG. 3 as 300, and comprises a light source (such as light box 310), a retroreflecting polarizer 320 as described above, a diffuser/depolarizer 330, and optional reflector 340. Light ray A incident on the retroreflecting polarizer 320 is split into p-polarized light as P and s-polarized light indicated as S. The S component is returned to the light box 310 where it is depolarized and scattered by the diffuser/depolarizer 330. If the diffuser/depolarizer 330 is partially transparent, optional reflector 340 may be used to increase the output of the preferred polarization direction of light from the backlighting system 300. Scattered light, indicated by S&P, will proceed back to the retroreflecting polarizer 320. P-polarized light, incident on the retroreflecting polarizer at large angles to its normal vector, will also be reflected and can be recycled by the method just described for s-polarized light.

Light sources can be located internally or externally from the light box 310. It is also possible for the light box 310 to incorporate the diffuser 330 and/or reflector 340 into an integral unit. For example, some electroluminescent (EL) panels comprise white powder in a binder coated on an aluminum plate. Thus, the EL panel serves as light source, diffuser, and reflector combined.

When a collimated beam of light strikes a rough surface, components of the beam are scattered in many directions. If the rough surface has facets that are very large compared to the wavelength of the light, geometrical optics is said to be applicable, and the finite number of reflected (or refracted and transmitted) beams are predictable by geometry and the laws of reflection and refraction. Cut and polished gemstones are good examples. If the facets are curved, their radii of curvature must also be much greater than the wavelength of light for geometrical optics to be applicable.

On the other hand, if the facets and their radii of curvature are roughly of the same order of magnitude as the wavelength of light, the incoming light beam is no longer reflected into a finite number of outgoing beams. Instead, the incoming optical energy is scattered into a continuous distribution of energy versus direction. Rough surfaces with this characteristic are called diffuse, and light scattered from such objects (either forward or backscattered) is termed diffuse light. A diffuser (as used here) is a surface or object producing this effect. The rough surfaces can be optical interfaces which are internal to solid objects with smooth outer surfaces. A good example is white enamel paint on fluorescent light fixtures. Small white particles are embedded in a clear paint base. A proper diffuser not only scatters incoming light in all directions, but depolarizes it as well, producing outgoing rays with random polarization directions.

Figure 6:
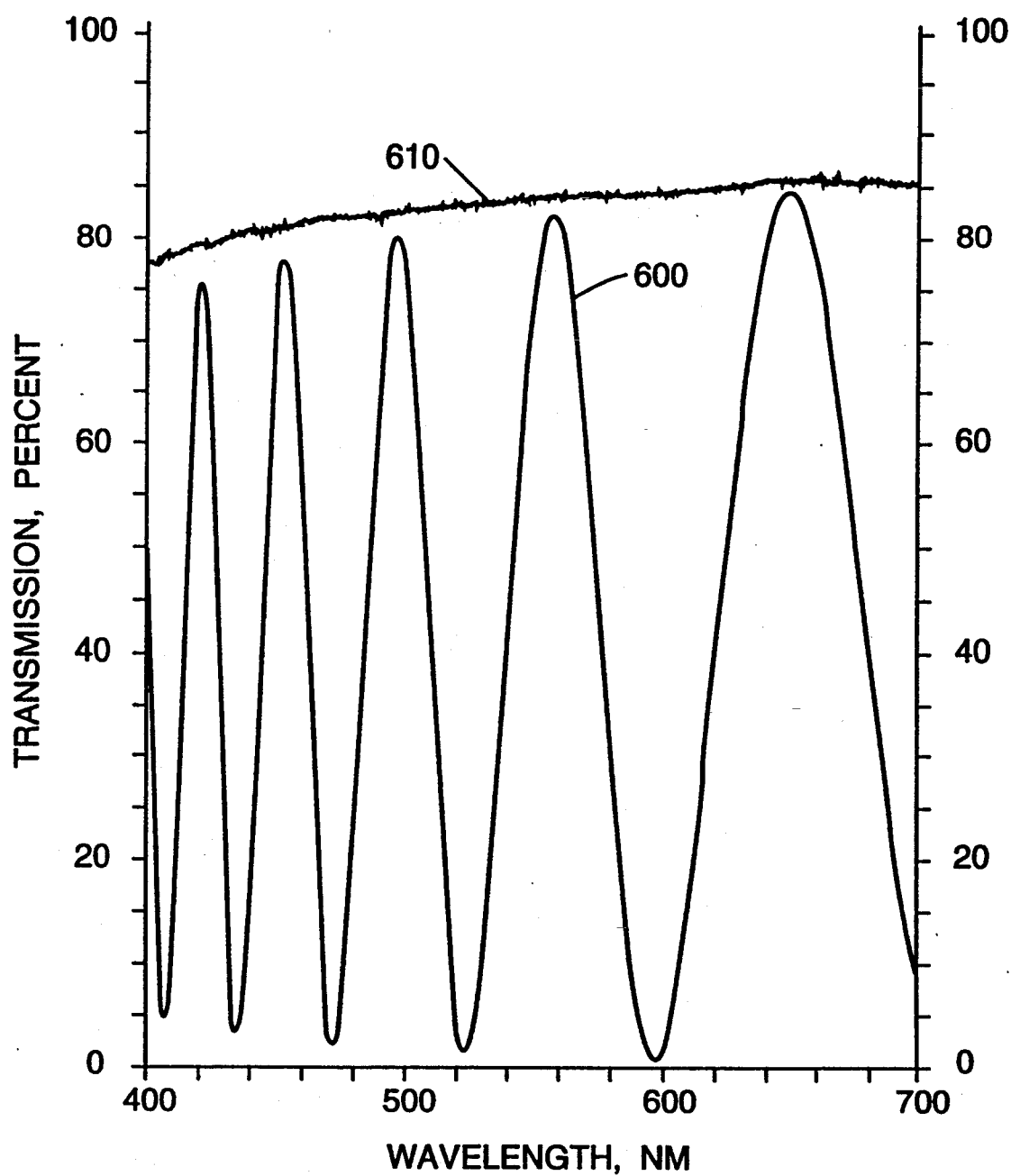
FIG. 6 is a graph of the transmission of polarized and unpolarized light through a component of the invention.

A suitable alternative method of depolarizing light consists of passing the light through a highly birefringent plate such as a sheet of polyester. As shown in FIG. 6, polarized light of certain wavelengths, as indicated by the peaks of the curve 600 corresponding to odd multiples of a basic quarter-wavelength, is transmitted by a crossed second polarizer after passing through a 0.1016 mm (0.004 inch) thick sheet of oriented polyester. The upper line 610 represents the transmission of the polyester without crossed polarizers present. The transmission of two parallel polarizers is referenced as 100%. This technique is known as spectral depolarization. The light represented by Curve 600 is not completely depolarized, so if this arrangement were used with a parallel mirror and reflecting polarizer on collimated light, those wavelengths corresponding to the minima of curve 600 would never be transmitted. However, if the light is non-collimated, as in most LCD backlighting devices, the light comes through the polyester at various angles, and sees a birefringent plate of thickness equal to the actual thickness divided by the cosine of the angle of incidence, i.e., the wavelength minima in the transmission spectrum will move by varying degrees, depending on the angle at which it pass through the polyester. By averaging over all angles of incidence, the light is effectively depolarized. It is assumed that a given ray of light will not retrace its path upon subsequent reflections. If it did so, only certain wavelengths would ever be converted.

With this method, the birefringent plate is used in place of diffuser 330. To ensure that a given ray of light passes through the birefringent plate at various angles upon succeeding reflections, it may be desirable to combine the birefringent plate with a faceted mirror, which would be used in place of reflector 340.

This method can be combined with another technique. If the birefringent plate varies in optical thickness across its face, such that various rays of light directed to a given LCD pixel area have all seen a different magnitude of birefringence, the light will be effectively depolarized. The minimum variation of birefringence needed for components of light going to a single pixel is just the wavelength range between the extrema shown in FIG. 6. This technique is known as spatial depolarization. In FIG. 6, the reason the minima do not go to zero and the maxima do not go to the transmission value of bare polyester, is the spatial depolarization due to thickness variations of the polyester over the beam area of the spectrophotometer used to make the measurements. The most preferred embodiment of this alternative technique for depolarization would produce well-flattened out extrema.

A third method of depolarizing the light would be a combination of a diffuser and a birefringent plate.

The backlighting system of the invention offers several advantages. The retroreflecing polarizer can be designed to work with a diffuse light source and still effect the recycling of the reflected polarization component. The diffuser depolarizes this reflected light, eliminating the need for a precise quarterwave birefringent plate. The diffuser also allows for uniform conversion with respect to wavelength, preventing color shifts in the backlight after conversion. The system also directs diffuse light into a forward cone, which increases the brightness of the display as perceived by a viewer within that forward cone.

The diffuser/depolarizer and reflector can be combined by placing a diffuse coating on a mirror. The diffuse coating can be a white pigment in a binder, sintered white powder, or a crystalline polymer such as polytetrafluoroethylene. However, the reflector is not needed at all if the diffuser/depolarizer is thick enough and "white" enough (i.e., has low enough absorption), but in practice a thin diffuser backed by a silvered mirror or film may be preferable.

The simplest configuration of the invention comprises a wide angle retroreflecting polarizer placed directly on an existing backlighting system to make a simple polarized light system. This would eliminate heat buildup in, for example, the first absorbing polarizer of an LCD panel. If no conversion of the reflected polarized light into the desired polarization sense occurs, the heat buildup all occurs in the backlighting system, due to absorption of that light. The increased heat load may be tolerated in that case, depending on the system design.

Backlighting systems differ in the placement and shape of the light source, which is often some form of fluorescent tube. Several example configurations are edge-lit, flat fluorescent, serpentine fluorescent tubes, and banks of straight fluorescent tubes. They all differ in thickness, weight, and the area they are designed to illuminate. Electroluminescent panels are similar to the flat fluorescent shape, although thinner. Unless specifically designed otherwise, these backlighting systems supply randomly directed (diffuse), unpolarized light to a display.

Figure 4:
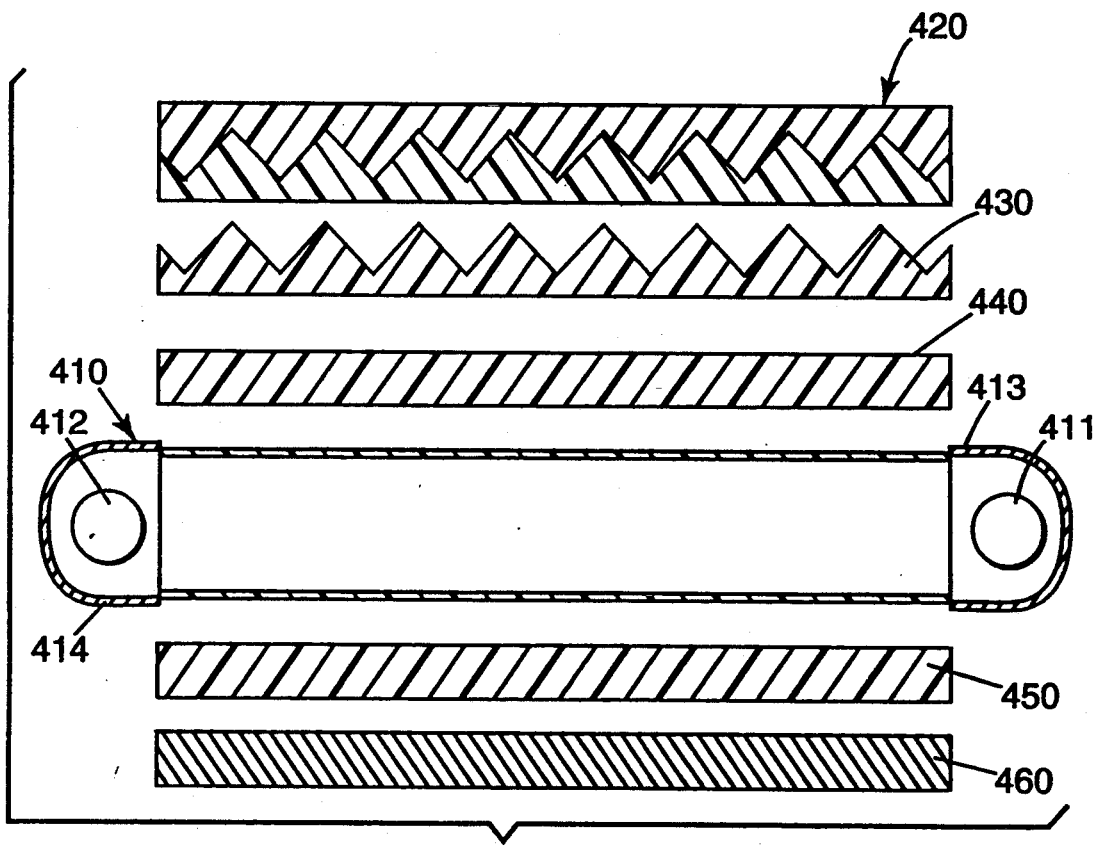
FIG. 4 is a schematic cross sectional view of another optical system according to the invention.

An example of an edge lit display system is shown in FIG. 4. Light box 410 comprises fluorescent tubes 411 and 412, and reflectors 413 and 414. As shown, the fluorescent tubes are parallel to the grooves of the retroreflecting polarizer 420, and also parallel to the grooves of an optional element, a piece of totally internally reflecting (TIR) material 430. However, this is not required, and due to the retroreflecting nature of the retroreflective polarizer 420, it may be preferable to orient the fluorescent tubes 411 and 412 perpendicular to the groove direction so that all light is not reflected directly back to the tubes. Top diffuser 440 represents an alternative location to that of bottom diffuser 450. In all cases, for optimum efficiency, the diffuser 440 or 450 should absorb little or none of the light. One satisfactory diffuser is a sheet of polytetrafluoroethylene 0.0381 mm (0.015 inch) in thickness. Mirror 460 is not needed if the diffuser is thick enough to reflect all the light. In the case of the 0.0381 mm (0.015 inch) thick polytetrafluoroethylene film, much of the light is transmitted, but a silver coated polymer film may be placed beneath the film to produce greater than ninety-five percent diffuse reflectance. With only a five percent loss on each diffuse reflection, and another five percent loss in the retroreflecting polarizer due to leakage and absorption, a significant portion of the rejected light could have at least ten reflections and depolarizations in an attempt to convert it to p-polarized light within the forward transmitted cone.

A rather large number of thin film layers is required to make a wide angle broadband retroreflective polarizer. The number of layers could be reduced if the incident light were restricted to less than a hemispherical cone angle. The preferred TIR material 430, taught in U.S. Pat. No. 4,805,984 (Cobb, Jr.), is known to produce this effect with diffuse light, thus it may be advantageous to place a sheet of it between the polarizer and the rest of the backlighting system. This effect is described in U.S. Pat. No. 4,791,540 (Dreyer, Jr. et al.). The diffuser and mirror requirements of the backlighting system would be the same.

In practice, a system such as shown in FIG. 4 could be made by laminating all components together. Practical systems could be as thin as 3 to 5 millimeters.

Figure 7:
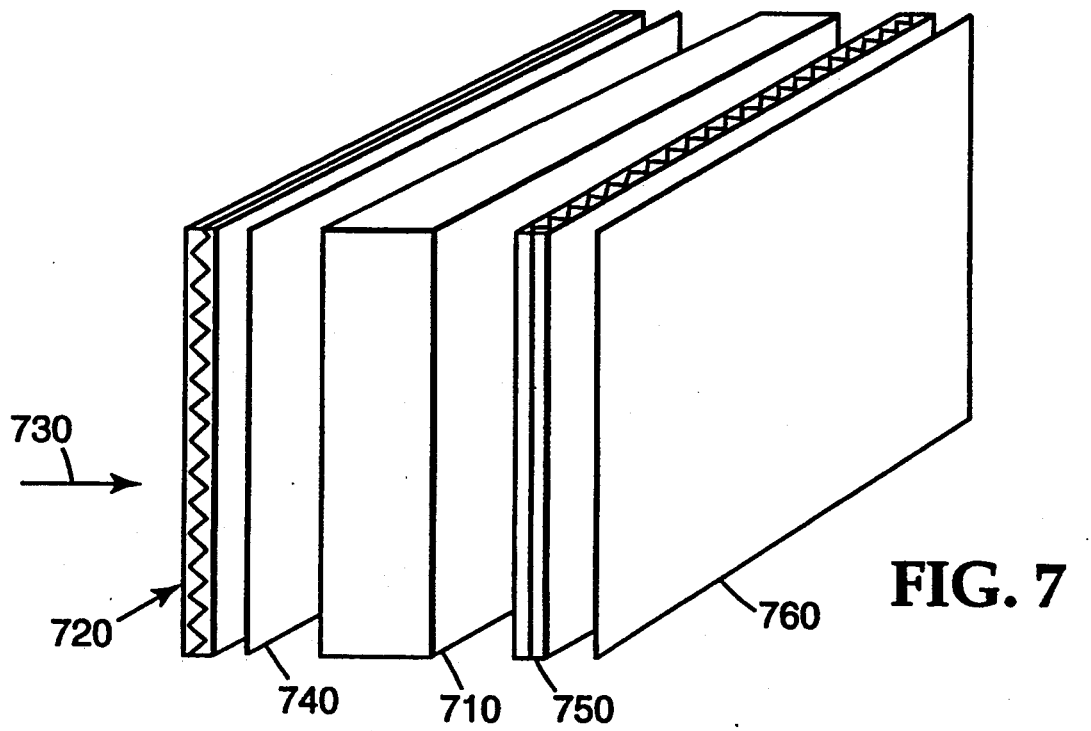
FIG. 7 is a perspective view of another embodiment of the invention.

FIG. 7 shows an embodiment of the invention employing a LCD panel. A liquid crystal panel 710 comprises liquid crystal material between glass or polymer plates, and is pixelated by striped electrodes on the plates. When located between crossed polarizers and unpowered, no light is transmitted by the system.

First retroreflecting polarizer 720 interacts with random unpolarized light 730, preventing about 50 percent of the light that a conventional polarizer would reflect or absorb (depending on the type of polarizer used) from being lost. Use of the first retroreflecting polarizer 720 also reduces the heat buildup in the system. An optional first polarizer 740 may be used with first retroreflecting polarizer 720, oriented parallel to the first retroreflecting polarizer 720 to improve performance in any part of the spectrum not completely polarized by the retroreflecting polarizer 720.

The second polarizer interacts only with polarized light. The direction of polarization of the light varies from pixel to pixel, depending on whether a dark or bright pixel is required by the image being created by the LCD panel 710. For the darkened pixels, the light transmitted by the LCD plate has a polarization crossed with respect to the second polarizer, and will be absorbed there, unless an optional second retroreflecting polarizer 750 is used. As with the first retroreflecting polarizer, this will reduce the heat load on the LCD panel 710, and allow recycling of the light as well, assuming other pixels nearby are active such that they can utilize this portion of reflected light after being scattered by the diffuser. A second absorbing polarizer 760, oriented parallel to the second retroreflective polarizer 750, may be used to improve performance.

In direct view systems, where a person is facing the second polarizer of the LCD panel 710, a retroreflecting polarizer 750 will appear as a partial mirror, giving an undesireable glare from ambient light. In this case, a second absorbing polarizer 760 is desirable as well.

I claim:

1. An optical backlighting system comprising:
(a) a source of incident light of mixed polarization;
(b) a retroreflecting polarizer, comprising:
a first substrate having a structured surface consisting of a linear array of substantially right angled isosceles prisms arranged side by side and having perpendicular sides which make an angle of approximately 45° with respect to the tangent to a smooth surface opposite the structured surface,
a second substrate essentially like the first substrate, wherein the structured surfaces on each substrate face each other,
an optical stack, provided between the two structured surfaces, of alternating thin film layers of high and low refractive index materials of selected optical thicknesses; the first and second substrates and the optical stack are all optically cemented to form a single unit in which the refractive index of the first and second substrates, and the refractive indices and optical thicknesses of the thin film layers of the optical stack, are all chosen to produce selective reflection of polarized light, such that:
within one portion of the optical stack, an incident light beam of mixed polarization is separated into an s-polarized component and a p-polarized component,
the s-polarized component is reflected onto another portion of the optical stack and there reflected parallel to the incident beam but proceeding in an opposite direction, and
the p-polarized component is transmitted parallel to the incident beam;
(c) means for diffusing and depolarizing light, provided adjacent the light source; and
(d) a display device employing polarized light, provided on a side of the retroreflecting polarizer opposite the light source, wherein the p-polarized component is transmitted to the display device, and the s-polarized component is reflected back to the means for diffusing and depolarizing light.

2. The system of claim 1, wherein the means for diffusing and depolarizing comprises a birefringent material.

3. The system of claim 1, further comprising an absorbing polarizer positioned between the retroreflecting polarizer and the display device.

4. The system of claim 1, further comprising a totally internally reflective material positioned between the light source and the retroreflecting polarizer.

5. The system of claim 1, wherein the display device is a pixellated image display device.

6. The system of claim 1, wherein the means for diffusing and depolarizing light is partially transparent, the system further comprising a reflector adjacent a side of the light source opposite the display device, such that a portion of the s-polarized component incident upon the means for diffusing and depolarizing is scattered, and a remainder portion of the s-polarized light incident upon said means passes through said means, is incident upon the reflector, and is reflected back to said means.

7. The system of claim 6, wherein the reflector is a reflective layer deposited on the means for diffusing and depolarizing light.

* * * * *

UNITED STATES PATENT AND TRADEMARK OFFICE
CERTIFICATE OF CORRECTION

PATENT NO.: 5,422,756
DATED: June 6, 1995
INVENTOR(S): Michael F. Weber

It is certified that error appears in the above-identified patent and that said Letters Patent is hereby corrected as shown below:

Column 4, line 44, please delete "tan $(\theta_L) = (n_L/n_H)$" and add --tan $(\theta_H) = (n_L/n_H)$--.

Column 6, line 1, please delete "product" and add --produce--.

Column 6, line 18, after "$TiCl_4$" please delete ")".

Column 7, line 1, please delete "methelene" and add --methylene--.

Column 7, line 17, please delete "(Cobb, Jr.)" and add --(Cobb, Jr.).--.

Column 7, line 63, please delete "complimentary" and add --complementary--.

Column 9, line 60, please delete "retroreflecing" and add --retroreflecting--.

Column 11, line 49, please delete "undesireable" and add --undesirable--.

Signed and Sealed this

Twenty-eighth Day of November 1995

Attest:

BRUCE LEHMAN

Attesting Officer    Commissioner of Patents and Trademarks